United States Patent [19]
Cheruvu

[11] Patent Number: 4,556,545
[45] Date of Patent: Dec. 3, 1985

[54] METHOD FOR CONDITIONING PHOSPHATE ORES

[75] Inventor: Subrahmanyam Cheruvu, Mercerville, N.J.

[73] Assignee: Mobil Oil Corporation, New York, N.Y.

[21] Appl. No.: 647,503

[22] Filed: Sep. 5, 1984

[51] Int. Cl.[4] .......... C01F 1/00; C01F 5/00; C01B 25/16; B03D 1/14

[52] U.S. Cl. .......... 423/167; 423/319; 423/320; 209/166

[58] Field of Search .......... 423/319, 320, 321 R, 423/321 S, 167; 209/5, 166

[56] References Cited

U.S. PATENT DOCUMENTS

| | | | |
|---|---|---|---|
| 2,105,826 | 1/1938 | Tartaron | 209/166 |
| 2,922,522 | 1/1960 | Fenske | 209/166 |
| 3,032,197 | 5/1962 | Northcott | 209/166 |
| 3,259,242 | 7/1966 | Snow | 209/166 |

OTHER PUBLICATIONS

Phosphate Flotation, by Paul R. Smith, Jr., reported in A. M. Gaudin Memorial Volume, Editor, M. C. Fuerstenau, Editor, published by American Institute of Mining, Metallurgical and Petroleum Engineers, Inc., N.Y., 1976, vol. 2.

*Primary Examiner*—Gregory A. Heller
*Attorney, Agent, or Firm*—Alexander J. McKillop; Michael G. Gilman; Stanislaus Aksman

[57] ABSTRACT

There is disclosed an improved process of beneficiating phosphate-containing ores. The process comprises stabilizing a hydrocarbon oil, normally used in a conditioning step to improve separation of the ore from the solid contaminants in a flotation step, upstream of the conditioning step. The oil is stabilized by conducting it to a pre-stabilization step wherein it is mixed with at least one fatty acid or saponified fatty acid and water to form a stable, homogeneous emulsion. The emulsion is then transferred to the conditioning step wherein it is mixed with the phosphate-containing ore.

25 Claims, No Drawings

METHOD FOR CONDITIONING PHOSPHATE ORES

BACKGROUND OF THE INVENTION

1. Field of the Invention

This invention relates to an improved method of processing ores, and particularly phosphate ores. More particularly, the present invention relates to an improved method of conditioning slimes-containing phosphate ores before the flotation step of the beneficiation process.

2. Discussion of the Prior Art

Phosphate-containing ores, are normally concentrated, or beneficiated in a series of operations which result in a product having a higher content of phosphate values (e.g., 70% BPL), than the original ore. Normally, the ore is mined by removing the earth overburden from above the underground ore deposits, and then the ore is slurried with a water jet to form an aqueous slurry. The slurry is then transported, by any suitable means, e.g., a pipeline, to a beneficiation plant wherein the ore is screened to remove large size phosphate particles (larger than $\frac{3}{4}$ inch). The undersize ore (particles smaller than $\frac{3}{4}$ inch), in the aqueous pulp form, is subjected to screening and washing operations, to separate +1 mm. particles of the ore, called pebble. The −1 mm. size material is conducted to a downstream sizing step wherein the −150 mesh size material is removed to generate a substantially −1 mm. to +150 mesh size material. The −150 mesh size material, which is discarded as waste, is commonly referred to as "slimes". The −1 mm to +150 mesh size material is then subjected to a sizing operation to produce a −1 mm. to +35 mesh size fraction and a −35 to +150 mesh size fraction, commonly referred to as "conditioner feed", which are fed separately to the conditioning and flotation steps. The major portion of this material has the size within the 35–150 mesh size range. As used herein, the term "mesh size range" refers to standard Tyler screen mesh sizes.

In the conditioning step, this feed is contacted with chemical additives which aid in, in a downstream flotation step, in separating the phosphate particles from the contaminants, especially silica particles. The chemical additives typically used in the conditioning step are fatty acids, which sometimes have been previously saponified with alkali, and a hydrocarbon oil, such as fuel oil, see, for example, Tartaron, U.S. Pat. No. 2,105,826, Fenske, U.S. Pat. No. 2,922,522, Northcott, U.S. Pat. No. 3,032,197 and Snow U.S. Pat. No. 3,259,242. Water is also introduced into the conditioning step to obtain a slurry containing about 70% solids, and the slurry is vigorously mixed with the chemical additives and the water. The slurry is then conducted, after further water addition, to a flotation step wherein the phosphate particles are preferentially floated from silica and other contaminating particles.

The operations described above are called rougher conditioning and rougher flotation.

The previously-used conditioning and flotation process steps produced relatively low phosphate yields when they were used to process high slime ores. It is believed that the relatively low efficiency of the conditioning and flotation steps was due to the action of slimes, which, disproportionately to their total content in the ore, bound and thus wasted the chemicals used in the conditioning step. It is also believed that the vigorous mixing required in the conditioning step of the prior art produced a certain proportion of slimes (defined herein as extremely finely divided solid particles, some of which are inherently present with the phosphate ores and bound thereto by physical bonds). The conditioning step, as practiced heretofore, required such a vigorous agitation because it was necessary to thoroughly mix the relatively small amounts of the chemical additives, e.g., fatty acid and fuel oil, with a relatively large volume of water and phosphate ore (slurry) to substantially uniformly distribute the chemical additives in the slurry. During this vigorous mixing, it is believed, large amounts of slimes were formed because the vigorous mechanical mixing physically comminuted larger solid particles of the clays into smaller particles, thereby forming slimes. In addition, it is believed, vigorous mixing also contributed to the breaking of the physical bonds between the slimes, inherently associated with the phosphate ores, and the phosphate ore particles. Both of these mechanisms contributed to an increase in the total amount of slimes in the conditioning tanks. As is known to those skilled in the art, the slimes are responsible for relatively poor efficiency of the utilization of the additive chemicals used in the conditioning step of phosphate ore processing operations. The slimes, it is believed, through a chemical or physical mechanism or a combination of both, reduced the effectiveness of at least a portion of the hydrocarbon oil, thereby preventing it from performing the intended function of conditioning the phosphate ore for the flotation operation.

Accordingly, it is a primary object of the present invention to provide an improved process for processing phosphate ores.

It is an additional object of the present invention to provide a process of beneficiating phosphate ores which efficiently utilizes the chemical additives used in the conditioning and flotation steps of the beneficiation process.

Other objects of the invention will become apparent to those skilled in the art from the following description of the invention and the appended claims.

SUMMARY OF THE INVENTION

In the process of the present invention, a hydrocarbon oil, e.g., fuel oil, utilized in the process to condition the phosphate ore is conducted to a pre-stabilization step, upstream of the conditioning step. In the pre-stabilization step, the hydrocarbon oil is combined with at least one fatty acid to form a mixture, which is then combined with water containing an alkaline agent under vigorous mixing to produce a substantially stable, substantially homogeneous emulsion. The emulsion is then introduced into the conditioning step, wherein it is contacted with the phosphate-containing ore. The product of the conditioning step is then conducted to a conventional, downstream flotation step of the operation.

In an alternative embodiment, only a portion of the hydrocarbon oil is conducted to the pre-stabilization step, and the remainder of the hydrocarbon oil is conducted to the conditioning step.

In another alternative embodiment, the hydrocarbon oil is combined in the pre-stabilization step with a solution of a previously-saponified fatty acid in water.

In yet another alternative embodiment, only a portion of the hydrocarbon oil is combined in the pre-stabilization step with a solution of a previously-saponified fatty acid in water, and the remainder of the hydrocarbon oil is added directly to the conditioning step.

DETAILED DESCRIPTION OF THE INVENTION

The phosphate-containing ore used in the process of the present invention is any ore containing phosphate values, such as Florida or North Carolina phosphate ore.

Similarly, the hydrocarbon oil used in the process of the present invention is any of the oils commonly used in phosphate-ore processing, such as kerosene, fuel oil, Number 5 fuel oil or any other suitable hydrocarbon having an API gravity of about 18 to about 24. It is also possible to use a mixture of such oils, such as a mixture of kerosene and fuel oil. The most preferred hydrocarbon oil is Number 5 fuel oil.

The fatty acid or acids used herein are also any fatty acids conventionally used in anionic froth flotation operations, such as fatty acids, mixed fatty acids, fatty acids derived from natural sources, such as tall oils, fatty acids derived from animal and vegetable oils, organic high-molecular weight acids and mixtures thereof.

In the preferred embodiment of the present invention, the fatty acid or acids are introduced into the pre-stabilization step of the present invention and mixed with the oil. Subsequently, the thus-obtained mixture of a fatty acid and oil is combined, also in the pre-stabilization step of the invention, with water containing at least one alkaline agent with vigorous mixing. The alkaline agent saponifies the fatty acid, thereby forming a soap, or a salt of the fatty acid. It is believed, that the saponified fatty acid stabilizes fuel oil droplets in water because of its detergency. It is also believed, that mixing helps to reduce the size of the stabilized oil droplets. The pre-stabilization step is conducted until it produces a substantially stable, substantially homogenous emulsion.

In an alternative embodiment of the present invention, the fatty acid or acids are first saponified by any conventional means, e.g., by reacting them with one or more alkaline agents in water. Subsequently, the saponified fatty acid or acids are combined in the pre-stabilization step with the hydrocarbon oil to form a substantially stable, substantially homogeneous emulsion.

In all of the above embodiments, it is also possible to stabilize only a portion, e.g., about $\frac{1}{3}$ to $\frac{2}{3}$ of the hydrocarbon oil, in the pre-stabilization step. Subsequently, the thus-obtained substantially stable, substantially homogeneous emulsion is conducted to the conditioning step wherein it is contacted with the phosphate ore and the remainder of the hydrocarbon oil. The amount of the oil added to the conditioning step in the unstabilized or raw form is adjusted to achieve the desired amount of frothing on flotation machines.

The hydrocarbon oil is stabilized in the pre-stabilization step, in all of the above-discussed embodiments, at a pH of about 8 to about 11.5, preferably about 9.5 to about 10.5, and most preferably at about 10.

In all of the embodiments, the product of the pre-stabilization step comprises about 2 to about 25%, preferably about 4 to about 10%, and most preferably about 4 to about 5%, by weight of the saponified fatty acid and hydrocarbon oil, with the weight ratio of hydrocarbon oil to fatty acid being about 1:1 to 6:1, preferably about 1:1 to about 4:1 and most preferably about 1:1 to about 3:1.

The fatty acid is saponified, either prior to the pre-stabilization step, or in-situ during the pre-stabilization step, by contacting it with at least one alkaline agent. Suitable alkaline agents are bases of alkali or alkaline earth metals, such as hydroxides of lithium, sodium, potassium and barium, ammonium hydroxide, carbonates of sodium and potassium, and mixtures thereof. The alkaline agent is usually used as an aqueous solution thereof, containing about 5 to about 15% of the alkaline agent in the solution. However, it will be apparent to those skilled in the art that the concentration of the alkaline agent in the aqueous solution is not critical to the process of the present invention and that any concentration thereof which is effective in saponifying the fatty acid or acids can be used in the process of the present invention.

The crucial aspect of the present invention is the formation of a substantially stable, substantially homogeneous emulsion of hydrocarbon oil with water and saponified fatty acid upstream of the conditioning step. It was found that the formation of such a stable, homogeneous emulsion of hydrocarbon oil improves the utilization of the chemical additives, such as fuel oil and the fatty acid, normally added in the conditioning step to aid in the separation of the phosphate values from the solid contaminants in the flotation step. It will be apparent to those skilled in the art that, instead of the saponified fatty acids, any other chemicals having detergent properties, e.g., petroleum sulfonates and commercial detergents, may be used in the pre-stabilization step of this invention to form a stable emulsion of hydrocarbon oil in water. The improved efficiency of utilization of the chemicals is demonstrated by the improved phosphate yields when the process of the present invention is compared to prior art processes wherein the chemical additives are added directly to the conditioning step of the process without the formation of a stable emulsion of the hydrocarbon oil in the pre-stabilization step. Without wishing to be bound by any theory of operability, it is thought that the formation of the stable emulsion in the pre-stabilization step is a result of the negative polarity induced on the fuel oil droplets by the fatty acid ions. These negatively charged fuel oil droplets, it is believed, repel each other to stay in a stable emulsion form. They also repel silica and clay particles which are also negatively charged during the conditioning step, thus reducing the reagent wastage.

In the present invention, the hydrocarbon oil must be pre-stabilized in a pre-stabilization step, upstream of the conditioning operation, with a relatively large amount of water, as described above. As a result, the emulsion of chemical additives introduced into the conditioning step has a larger volume than that introduced into the conditioning step in the processes of the prior art. Therefore, a lesser amount of and less vigorous mixing is required to thoroughly combine the emulsion with the phosphate ore. Without wishing to be bound by an theory of operability, it is believed that the decreased amount of mixing decreases the amount of slimes generated during the mixing operation, thereby decreasing the amount of the hydrocarbon oil adsorbed by the slimes, and increasing the amount thereof which is available for the phosphate particles.

The following Examples further illustrate the essential features of the invention. However, it will be apparent to those skilled in the art that the specific reactants and reaction conditions used in the Examples do not limit the scope of the invention.

EXAMPLE 1

(Direct Addition of Fuel Oil and Fatty Acid to Ore)

In this comparative example, fuel oil and fatty acid were added directly to the phosphate ore in the conditioning step of the beneficiation process in accordance with the teachings of the prior art.

1400 grams of phosphate conditioner feed (−35 to +150 mesh size fraction) obtained from a Florida phosphate mining plant was introduced at 70% by weight into a 3.3 liter plexiglass vessel. Under agitation using a mechanical stirrer at 300 rpm, the slurry pH was raised to about 9.5 by adding ammonium hydroxide, and maintained at that pH for 0.2 minutes. 0.55 ml of Sylvachem FR 6 fatty acid (obtained from Sylvachem Corporation, Port St. Joe, Fla.) and 1.7 ml of No. 5 Fuel Oil (obtained from Belcher Fuel Oil Company, Tampa, Fla. were introduced by two separate conduits into the vessel. The stirring at 300 RPM was continued for 0.55 minutes. Subsequently, the mixture was introduced into about a 5.5 liter D-12 Denver Laboratory flotation cell (produced by Denver Equipment Division, Joy Manufacturing Company, Denver, Colo.) the flotation cell was filled with water and the flotation was carried out for 3.0 minutes. The floated material called rougher concentrate was collected and analyzed to determine phosphate concentration and yield.

EXAMPLES 2–4

(Direct Addition of Fuel Oil and Fatty Acid to Ore)

Three more examples, Examples 2–4, were conducted at different conditioning times in the conditioning step, while all of the other example ingredients and parameters were maintained identical to those of Example 1.

The results are compared, in Tables 1 and 2 below, with the results obtained by stabilizing the fuel oil, in accordance with the present invention, in a pre-stabilization step, as discussed in detail in Example 5.

EXAMPLE 5

(Stabilization of Fuel Oil in Pre-Stabilization Step Upstream of the Conditioning Step)

In this example, the fuel oil was first stabilized in the pre-stabilization step of this invention upstream of the conditioning step. The fuel oil and fatty acid used in this example were the same as those used in Examples 1–4.

1.5 ml of Number 5 fuel oil and 0.47 ml of Sylvachem FR6 fatty acid were added to a test tube. Since these two chemicals are miscible, they quickly formed a uniform mixture upon shaking the test tube. This mixture was then added to a Waring blender containing an aqueous solution of ammonium hydroxide having a pH of 9.9 and the entire contents were mixed for 10 seconds. The thus-obtained homogeneous emulsion containing about 95% water by weight was conducted to a conditioning step, conducted in the 3.3 liter plexiglass vessel, used in Example 1, wherein it was mixed with 1400 grams of conditioner feed of a Florida phosphate plant at 70% solids and pH of about 9.5. The mixing was continued at 300 RPM for 0.55 minutes. The conditioned mixture was then subjected to a flotation operation, identical to that of and conducted in the same equipment as in Example 1, wherein the phosphate values were preferrentially separated from the solid contaminants. The rougher concentrate was collected and analyzed to determine the phosphate concentration and yield.

EXAMPLES 6–8

(Stabilization of Fuel Oil in Pre-Stabilization Step Upstream of the Conditioning Step)

Three more examples were conducted with ingredients and experimental parameters identical to those of Example 5, but at different conditioning periods. The results are compared to those obtained in Examples 1–4 in Table 1.

TABLE 1

Comparison of Pre-stabilized Reagents Versus Directly Added Reagents at Different Conditioning Periods in Laboratory

| | | Direct Addition Fatty Acid (FA) Dosage = 0.75 lbs/ton* | | Prestabilized FA Dosage = 0.65 lbs/ton* | | |
|---|---|---|---|---|---|---|
| Ex. No. | Conditioning Period (min.) | Phosphate Yield (%) | Rougher Concentrate Grade (% BPL)** | Ex. No. | Phosphate Yield (%) | Rougher Concentrate Grade (% BPL) |
| 1 | 0.75 | 78 | 60.2 | 5 | 88.5 | 64.6 |
| 2 | 1.00 | 84.4 | 65.2 | 6 | 92.4 | 61.6 |
| 3 | 1.25 | 87.5 | 63.4 | 7 | 92.7 | 65.1 |
| 4 | 1.50 | 88.6 | 63.0 | 8 | 93.6 | 65.0 |

*Fuel oil to fatty acid ratio was maintained at 3 to 1.
**BPL is a measure of phosphate, $P_2O_5$, in the product. The amount of phosphate is calculated from the following equation: % $P_2O_5$ = BPL × 0.4576

EXAMPLES 9–12

(Stabilization of Fuel Oil in Pre-Stabilization Step Upstream of the Conditioning Step)

Four more comparative tests were conducted in a commercial size operation at a phosphate plant. The fatty acid and fuel oil used in these tests were the same as those used in Examples 1–8. These tests were conducted in the manner set forth below.

EXAMPLES 9 AND 11

These two Examples represent prior art operations, wherein fatty acid and fuel oil are added directly (without pre-stabilization) to the conditioning step. The experimental system consisted of four tanks in series, each 4 feet in diameter and 3 feet high, each containing a mechanical stirrer stirring at about 200 rpm. The conditioner feed at 70% solids was fed to the first tank (Tank 1) wherein a pH modifying agent (ammonium hydroxide) was also added, such that a pH of about 9.5 was obtained in this tank. The solids then flowed through other Tanks (2, 3 and 4) before overflowing from Tank 4 to flotation machines. The fatty acid and fuel oil were added into Tank 2 and therefore they mixed with solids in Tanks 2, 3 and 4.

In these examples, the fatty acid flow and solids tonnage were selected to correspond to 0.7 lbs. of fatty acid dosage per ton of solids fed to the conditioning Tanks. The fuel oil to fatty acid weight ratio was maintained at 3 to 1.

When steady flow conditions were achieved, the samples were collected to evaluate the flotation results.

Example 11 was a repeat of Example 9, except 1.0 lbs. of fatty acid loading per ton of solids was used. Fuel oil to fatty acid weight ratio was again maintained at 3 to 1.

EXAMPLES 10 AND 12

These examples used the same commercial type equipment for conditioning used in Examples 9 and 11, but the fuel oil and fatty acid were added in the pre-stabilized form.

In Example 10, the fatty acid flow was selected such that its loading was 0.7 lbs. per ton of conditioner feed solids. Fuel oil to fatty acid weight ratio was maintained at 3 to 1 as in Examples 9 and 11. The fatty acid and fuel oil were first fed to a ¾" inside diameter (ID) and 15 feet long conduit containing 4" long in-line mixer. The conduit was then joined to the suction line of a centrifugal pump carrying water containing a sufficient amount of ammonium hydroxide to attain a pH of 9.9. The fatty acid, fuel oil and water formed a stable emulsion by the time they exited from the discharge of the pump because of the strong mixing action imparted to the contents in the pump casing. The water flow to the pump was set such that the discharge from the pump contained 5% fatty acid and fuel oil by weight.

The pre-stabilized reagents were then fed into Tank 2 of the conditioning tanks. Solids which were fed into the conditioner Tank 1 at 70% solids and at pH 9.5, as described in Examples 9 and 11 before, mixed with the pre-stabilized reagents in Tanks 2, 3 and 4. The contents overflowed from Tank 4 into flotation machines for subsequent flotation.

Samples were collected to determine the flotation phosphate yield and phosphate concentration.

Example 12 was a repeat of Example 10, except that 0.5 lbs. of fatty acid per ton of solids was used. Fuel oil to fatty acid weight ratio was also maintained at 3 to 1.

The results are summarized in Table 2, below.

TABLE 2

Comparison of Pre-stabilized Reagents Versus Directly Added Reagents in Commercial Tests

| Ex. No. | Fatty Acid Dosage* (lb/Ton of Solids) | Mode of Reagent Addition | Phosphate Yield (Wt. %) | Concentrate Grade (% BPL) |
|---|---|---|---|---|
| 9 | 0.7 | Direct | 43 | 65 |
| 10 | 0.7 | Pre-stabilized | 71 | 66 |
| 11 | 1.0 | Direct | 58 | 66 |
| 12 | 0.5 | Pre-stablized | 58 | 68 |

*Fuel oil to fatty acid ratio was maintained at 3 to 1.

The data of Table 1 indicates that, at the identical conditioning time periods, the pre-stabilization of fuel oil, in accordance with this invention, resulted in the increase of from about 5% to about 10%, depending upon the conditioning time, in the phosphate yield, as compared to the direct addition of fuel oil to the conditioning step. Also, much less conditioning time is required to attain similar phosphate yield.

The data of Table 2 indicates that at the identical levels of fatty acid dosage and at substantially the same concentrate grade, the pre-stabilization of fuel oil in commercial scale testing resulted in an increase of about 28% of phosphate yield, as compared to the direct addition of the fuel oil to the conditioning step. In addition, the data of Table 2 also indicates that twice as much fatty acid and fuel oil is needed with the direct addition of fuel oil to the conditioning step as is needed with the stabilization of fuel oil in the pre-stabilization step to obtain the same level of phosphate yield and substantially the same concentrate grade.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. A process of conditioning a phosphate-containing ore with a hydrocarbon oil and at least one fatty acid comprising the steps of:

(a) preparing a solution of at least one fatty acid in water containing an alkaline agent;

(b) combining the solution of step (a) with at least a portion of the hydrocarbon oil to form a substantially stable, substantially homogeneous emulsion; and (c) introducing the emulsion into the conditioning step wherein it is combined with the phosphate-containing ore and with the remainder of the hydrocarbon oil.

2. A process of claim 1 wherein the hydrocarbon oil has an API gravity of about 18 to about 24.

3. A process of claim 2 wherein the hydrocarbon oil is selected from the group consisting of kerosene, fuel oil, Number 5 fuel oil and mixtures thereof.

4. A process of claim 3 wherein step (a) is conducted at a pH of about 8 to about 11.5.

5. A process of claim 4 wherein step (a) is conducted at a pH of about 10.

6. A process of claim 5 wherein the fatty acid is selected from the group consisting of mixed fatty acids, tall oils, organic high molecular weight acids and mixtures thereof.

7. A process of claim 6 wherein step (b) is conducted under mixing conditions.

8. A process of claim 7 wherein the amount of the hydrocarbon oil used in step (b) is about ⅓ to about ⅔ of the total amount of the hydrocarbon oil utilized in the process.

9. A process of claim 8 wherein the amount of the hydrocarbon oil used in step (c) is about ⅔ to about ⅓ of the total amount of the hydrocarbon oil utilized in the process.

10. A process of claim 9 wherein the emulsion of step (b) comprises about 2 to about 25% by weight of saponified fatty acid and the hydrocarbon oil, the weight ratio of the hydrocarbon oil to the saponified fatty acid being about 1:1 to 6:1, and about 75% to about 98% by weight of water.

11. A process of claim 10 wherein the emulsion of step (b) comprises about 4 to about 10% by weight of the saponified fatty acid and the weight ratio of the hydrocarbon oil to the saponified fatty acid is about 1:1 to about 4:1.

12. A process of claim 11 wherein the emulsion of step (b) comprises about 4 to about 5% by weight of the saponified fatty acid and the weight ratio of the hydrocarbon oil to the saponified fatty acid is about 1:1 to about 3:1.

13. A process of conditioning a phosphate-containing ore with a hydrocarbon oil and at least one fatty acid comprising the steps of:

(a) combining at least a portion of the hydrocarbon oil with a fatty acid;

(b) combining the product of step (a) with water and an alkaline agent to form a substantially stable, substantially homogeneous emulsion; and (c) introducing the emulsion into the conditioning step wherein it is combined with the phosphate-containing ore and with the remainder of the hydrocarbon oil.

14. A process of claim 13 wherein the hydrocarbon oil has an API gravity of about 18 to about 24.

15. A process of claim 14 wherein the hydrocarbon oil is selected from the group consisting of kerosene, fuel oil, Number 5 fuel oil and mixtures thereof.

16. A process of claim 15 wherein step (b) is conducted at a pH of about 8 to about 11.5.

17. A process of claim 16 wherein step (b) is conducted at a pH of about 10.

18. A process of claim 17 wherein the fatty acid is selected from the group consisting of mixed fatty acids, tall oils, organic high molecular weight acids and mixtures thereof.

19. A process of claim 18 wherein the alkaline agent is selected from the group consisting of lithium hydroxide, sodium hydroxide, potassium hydroxide, ammonium hydroxide, sodium carbonate, potassium carbonate and mixtures thereof.

20. A process of claim 19 wherein the alkaline agent is ammonium hydroxide.

21. A process of claim 20 wherein the amount of the hydrocarbon oil used in step (a) is about $\frac{1}{3}$ to about $\frac{2}{3}$ of the total amount of the hydrocarbon oil utilized in the process.

22. A process of claim 21 wherein the amount of the hydrocarbon oil used in step (c) is about $\frac{2}{3}$ to about $\frac{1}{3}$ of the total amount of the hydrocarbon oil utilized in the process.

23. A process of claim 22 wherein the emulsion of step (b) comprises about 2 to about 25% by weight of saponified fatty acid and the hydrocarbon oil, the weight ratio of the hydrocarbon oil to the saponified fatty acid being about 1:1 to 6:1, and about 75% to about 98% by weight of water.

24. A process of claim 23 wherein the emulsion of step (b) comprises about 4 to about 10% by weight of the saponified fatty acid and the weight ratio of the hydrocarbon oil to the saponified fatty acid is about 1:1 to about 4:1.

25. A process of claim 24 wherein the emulsion of step (b) comprises about 4 to about 5% by weight of the saponified fatty acid and the weight ratio of the hydrocarbon oil to the saponified fatty acid is about 1:1 to about 3:1.

* * * * *